(12) United States Patent
Trandafir (10) Patent No.: US 10,593,103 B2
(45) Date of Patent: Mar. 17, 2020

(54) METHOD AND APPARATUS FOR MANAGING GRAPHICS LAYERS WITHIN A DATA PROCESSING SYSTEM

(71) Applicant: NXP USA, Inc., Austin, TX (US)

(72) Inventor: Andrei Alexandru Trandafir, Bucharest (RO)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 15/982,127

(22) Filed: May 17, 2018

(65) Prior Publication Data

US 2019/0043248 A1 Feb. 7, 2019

(30) Foreign Application Priority Data

Aug. 4, 2017 (RO) .............................. A201700550

(51) Int. Cl.
*G06T 15/50* (2011.01)
*G06T 11/40* (2006.01)
*G09G 5/377* (2006.01)

(52) U.S. Cl.
CPC ............ *G06T 15/503* (2013.01); *G06T 11/40* (2013.01); *G09G 5/377* (2013.01);
(Continued)

(58) Field of Classification Search
CPC ........ G06T 15/503; G06T 11/40; G09G 5/377
See application file for complete search history.

(56) References Cited

U.S. PATENT DOCUMENTS 5,831,628 A 11/1998 Shimizu
6,069,633 A 5/2000 Apparao et al.
(Continued)

FOREIGN PATENT DOCUMENTS

CA 2752344 A1 3/2013
CN 103761094 A 4/2014
(Continued)

OTHER PUBLICATIONS

Devai et al, "A Rectangle-Intersection Algorithm with Limited Resource Requirements," 2010 10th IEEE International Conference on Computer and Information Technology (CIT 2010), 6 pages.
(Continued)

*Primary Examiner* — Terrell M Robinson (57) ABSTRACT

A data processing system includes a graphics display component for creating an image to be displayed and a method therefor is described. The graphics display component includes: a layer selection module configured to: identify a set M of active layers for at least one pixel to be displayed; and a display controller unit, DCU, operably coupled to the layer selection module and comprising a blend manager; and at least one processor and one or more processing units. The at least one processor is configured to determine whether a number, m, of active layers in the set, M, exceeds a blend limit, n, of a maximum number of graphical surfaces that can be blended simultaneously by the DCU and, in response thereto, identify a subset N of up to n layers from the set M of active layers. The blend manager is configured to bind a first portion of active layers directly to the DCU and output any excess active layers in the set, M, that exceeds the n layers to at least one selected processing unit for blending. The DCU is configured to generate composite pixel data to be displayed based on separate blends from the DCU and the at least one selected processing unit that blended the excess active layers in the set, M.

18 Claims, 6 Drawing Sheets

(52) U.S. Cl.
CPC . *G09G 2320/0276* (2013.01); *G09G 2340/10* (2013.01); *G09G 2360/08* (2013.01); *G09G 2360/122* (2013.01)

(56) References Cited

U.S. PATENT DOCUMENTS

| | | | |
|---|---|---|---|
| 6,462,786 | B1 | 10/2002 | Glen et al. |
| 6,700,580 | B2 | 3/2004 | Lefebvre et al. |
| 6,917,877 | B2 | 7/2005 | Yang |
| 7,505,048 | B2 | 3/2009 | Su |
| 2004/0130558 | A1* | 7/2004 | MacInnis ................ G06T 9/00 345/629 |
| 2006/0197771 | A1* | 9/2006 | Tang ................ H04N 5/44508 345/581 |
| 2010/0079489 | A1* | 4/2010 | Cheng ................ G06T 15/503 345/629 |
| 2010/0171759 | A1* | 7/2010 | Nickolov ................ G06T 3/40 345/634 |
| 2011/0157474 | A1 | 6/2011 | Nagata |
| 2012/0117508 | A1 | 5/2012 | Amendolagine |
| 2014/0258253 | A1 | 9/2014 | Tirthapura et al. |
| 2014/0306957 | A1* | 10/2014 | Herrick ................ G06T 15/503 345/422 |
| 2015/0100884 | A1 | 4/2015 | Ryu et al. |
| 2016/0240172 | A1* | 8/2016 | Singh ................ G09G 5/363 |
| 2016/0328633 | A1* | 11/2016 | Pan ................ G06F 3/1208 |
| 2017/0076702 | A1 | 3/2017 | Tomescu et al. |
| 2017/0200251 | A1* | 7/2017 | Aubineau ................ G06T 1/20 |
| 2017/0316541 | A1* | 11/2017 | Kim ................ G06F 9/451 |
| 2017/0329613 | A1* | 11/2017 | Croxford ................ G09G 5/377 |
| 2018/0330468 | A1* | 11/2018 | Mao ................ G06T 15/503 |

FOREIGN PATENT DOCUMENTS

| | | |
|---|---|---|
| EP | 3270371 A1 | 1/2018 |
| RO | A201700550 | 8/2017 |
| WO | 2014139122 A1 | 9/2014 |
| WO | 2016087831 A1 | 6/2016 |

OTHER PUBLICATIONS

Devai et al, "An Optimal Rectangle-Intersection Algorithm Using Linear Arrays Only," downloaded May 16, 2018 from http:/www.widelands.org/~sirver/wl/141229_devail_rects.pdf, 10 pages.

Notice of Allowance for U.S. Appl. No. 15/982,328 dated Jul. 24, 2019, 19 pages.

* cited by examiner

METHOD AND APPARATUS FOR MANAGING GRAPHICS LAYERS WITHIN A DATA PROCESSING SYSTEM

CROSS-REFERENCE TO RELATED APPLICATIONS

This application claims priority under 35 U.S.C. § 119 to Romanian patent application no. A201700550, filed Aug. 4, 2017, the contents of which are incorporated by reference herein.

FIELD OF THE INVENTION

The field of this invention relates to a method and apparatus for managing graphics layers within a data processing system that includes a graphics display component, and in particular to an efficient software detection method of multiple layer overlaps and corresponding selection of blending components.

BACKGROUND OF THE INVENTION

In embedded integrated circuit applications, such as automotive applications, embedded devices include display controllers for, say, infotainment, instrument cluster displays, etc. In order to enable dynamic content creation, with minimal central processing unit (CPU) intervention, it is known for such embedded display controllers to read (e.g. fetch) image data for individual graphics layers so that they can be displayed directly from memory and thereby blended on-the-fly to generate one output image.

Graphical images displayed by automotive infotainment and instrument cluster displays are typically made up of a plurality of graphic layers that are combined (often referred to as 'blended') together in order to generate a composite image that is displayed to an end user. Accordingly, the embedded display controllers mentioned above fetch pixel data for multiple graphics layers, blend the pixel data for the multiple graphics layers to generate pixel data for the composite image to be displayed, and output the generated composite pixel data to a display device, all 'on-the-fly'.

Such embedded display controllers are typically implemented as hardware, and include a memory interface component that supports a plurality of data channels, each data channel arranged to receive pixel data relating to one graphics layer and store the received pixel data within a respective input (First-In-First-Out) buffer. The display controller may then perform functions, such as format conversion, blending, gamma correction, etc., 'on-the-fly' in order to generate composite pixel data to be output to a display device. Blending is performed to combine multiple graphical surfaces, e.g. blend multiple picture/pixel rectangles, in order to form a single image for a display. It is known that this function can be off-loaded from or to other processors that are normally responsible for it (such as the central processing unit (CPU) or graphical processing unit (GPU)).

A problem encountered by such display controllers is that the number of graphical surfaces/number of picture or pixel rectangles that they are capable of blending simultaneously is limited. If this blending limit is exceeded, the visual result will be incorrect. Conventionally, any graphical surfaces (e.g. number of picture or pixel rectangles) beyond the display controller blending limit are thereafter ignored by the display controller, with the respective pixel data being left out of the composite pixel data that is displayed. For example, if we assume that a display controller is able to only blend a maximum number of six surfaces simultaneously, then if it is requested or required to blend seven surfaces, then one surface will be completely ignored and the entire output will be incorrect, as it will have ignored the contribution of one surface. In optimized display systems, the graphics layers are dynamically assigned in order to ensure the highest priority graphics layers are blended within the composite pixel data. However, any additional graphical surfaces or number of picture or pixel rectangles beyond the display controller blending limit will still not be included within the composite pixel data, and their information will be 'lost' from the displayed image.

A number of solutions have been attempted to address the problem of detecting pairs of overlapping pixel rectangles, such that they can be blended, such as U.S. Pat. No. 7,505,048B2, U.S. Pat. No. 6,917,877B2, US20140258253A1 and U.S. Pat. No. 5,831,628A. However, the computational cost of using these solutions of detecting pairs of overlapping rectangles in order to obtain all of the maximal (largest size) sets of simultaneously-overlapping rectangles is impractical, as will be shown later. The maximal sets themselves are required so as to determine when a group of layers cannot be blended simultaneously by a display controller. A less complex solution is therefore needed.

SUMMARY OF THE INVENTION

The present invention provides a data processing system having a processor and one or more processing units and a graphics display component having a layer selection module, and a display controlling unit, and a method of managing graphics layers as described in the accompanying claims.

Specific embodiments of the invention are set forth in the dependent claims. These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Examples of the present invention will now be described with reference to the accompanying drawings. However, it will be appreciated that the examples of the present invention are not limited to the specific examples herein described and as illustrated in the accompanying drawings.

Research in this field has been targeted to address a problem of: 'given N rectangles, find all pairs of rectangles that overlap'. This research is fundamentally different to the problem that is targeted herein, of: 'given N rectangles, find all maximal sets of rectangles with a cardinality of at least 'C' where 'cardinality' means 'set size' and every pair of rectangles in the set overlaps'. Examples of the present invention describe a computationally efficient software algorithm and associated hardware that detects whether the blend limit exceeds the display controller limit and, in response thereto, determines if the surfaces overlap and, if they do, outputs the largest-size sets of simultaneously-overlapping surfaces. It is noted that determining if multiple surfaces, for example pixel rectangles, simultaneously overlap is a non-trivial problem. Thus, some examples of the invention identify all maximal sets of rectangles that cannot be blended simultaneously by a system that employs one or parallel pipeline(s), where each pipeline of a parallel pipeline implementation fetch pixels from a source surface (e.g. pixel rectangle).

In examples of the invention, an algorithm is run by a processor as a window compositor that can use its output to route the individual blending operations to the various pixel or graphical processors etc., in order to guarantee visual correctness, high performance and system responsiveness. In examples of the invention, the algorithm determines whether (or not) an arbitrary-sized set of layers can be blended directly by a DCU. The result of the algorithm is passed to a blend manager. If the algorithm determines that the arbitrary-sized set of layers can be blended directly by a DCU, then the blend manager binds each layer to a DCU pipeline, such as a FIFO pipeline and the DCU then generates a correct output image. However, in accordance with examples of the invention, if the algorithm determines that the arbitrary-sized set of layers cannot be blended directly by a DCU, then the blend manager is configured to decide which layers it binds directly to the DCU FIFO pipelines and which layers are blended by some other processing device, such as a CPU or GPU, etc. Next, these additional blends occur and provide some intermediate layers (each of these layers being the result of a blend performed on a separate device). Each of these intermediate layers is then bound to an empty DCU FIFO pipeline, and then the DCU once again generates the output image.

In this manner, given a random number of received image data layers 'm', a maximum use of a DCU that is fast at blending surfaces simultaneously and outputting an image to a display is achieved, even when the DCU is only able to blend 'n' layers that overlap simultaneously (considering n<m). The blend manager is then configured to route the data blended by the other processing device(s) 'back' to the DCU, as the DCU is always responsible for the final blend (the one which is displayed, such that the DCU is then always able to bind the layers and ensure correct blending. Thus, by using the blend manager and the proposed software algorithm, the DCU will always be able to output the pixel-correct blending result, irrespective of the number of input image data layers.

In some examples, it is envisaged that examples of the algorithm may also be easily parallelized on a multi-core platform to provide additional performance gains that may make the entire algorithm run even faster. The concepts herein described provide particular benefits in a single-core scenario. However, in some examples, the fact that the algorithm has steps that can be parallelized provides an additional advantageous feature.

Figure 1:
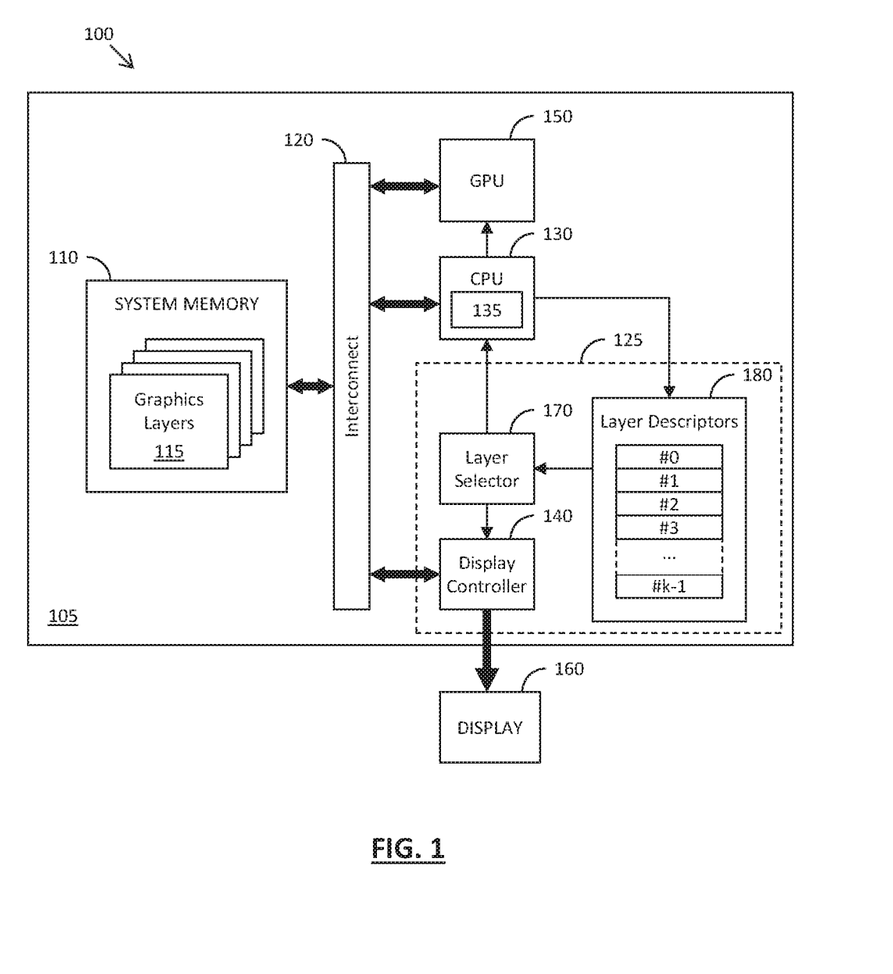
FIG. 1 illustrates a simplified block diagram of an example of a processing system, adapted in accordance with example embodiments of the invention.

Referring now to FIG. 1, there is illustrated a simplified block diagram of an example of a video data processing system 100 comprising a graphics display component 125. In some embodiments, the processing system 100 may comprise an embedded processing system, for example for use within an automotive application. For the example illustrated in FIG. 1, the processing system 100 resides within an integrated circuit device 105 and includes one or more memory elements forming a system memory 110. The system memory 110 may include, for example, flash memory, RAM (random access memory), etc. An interconnect component 120 is coupled between the system memory 110 and various system components, and arranged to enable said system components to access the system memory 110, for example to read and/or write data thereto. In the illustrated example, the system components include one or more processor(s), such as a central processing unit (CPU) 130, one or more display controller units (DCU) 140, and one or more graphics processing units (GPU) 150.

The illustrated DCU 140 forms a part of the graphics display component 125 for the processing system 100, and is arranged to fetch pixel data 116 for selected graphics layers 115 stored in system memory 110, blend the pixel data 116 for the selected graphics layers 115 to generate composite pixel data to be displayed, and output the generated composite pixel data to a display device 160. The graphics display component 125 for the illustrated example further includes a layer selection module 170 arranged to receive layer descriptors for the graphics layers 115 stored in system memory 110, select the graphics layers 115 to be blended by the DCU 140 for each pixel, and configure the DCU 140 to fetch the selected graphics layers 115 for each pixel. A primary function of the DCU 140 is to combine/blend the pixels from all pipelines and generate an output image. In the illustrated example, the layer descriptors are stored within a descriptor register set 180. However, they may alternatively be stored within an area of system memory 110, or alternatively within some other area of memory, such as a dedicated area of memory (not shown).

In accordance with examples of the invention, the one or more processor(s) 130 has been adapted to run a computationally efficient software algorithm 135 that is configured to detect if the blend limit is exceeded. In response thereto, the software algorithm 135, provides maximal sets of rectangles that cannot be blended simultaneously by a system that employs one or parallel pipeline(s), where each pipeline of the parallel pipelines fetch pixels from a source surface (which are illustrated as pixel rectangles in examples of the invention). Advantageously, the software algorithm 135 is able to determine the maximal sets of surfaces (given as rectangles) that require blending, but whose cardinality may be higher than a maximum allowed. Here, 'cardinality' refers to a number of elements in a set. In examples of the invention, the software algorithm 135 performed by the one or more processor(s) 130 takes N rectangles, e.g. given by (x1, y1, x2, y2), which can overlap in any way possible, as well as specify M as a maximum number of rectangles that the DCU 140 can blend simultaneously. Thereafter, in some examples, the software algorithm 135 performed by the one or more processor(s) 130 outputs sets of at least M+1 of the original N rectangle regions that are guaranteed to simultaneously overlap. Therefore, if one was to take any of these regions and blend all rectangles that overlap in it on the DCU 140, it is guaranteed to produce an incorrect result. Hence, in some examples, one role of the algorithm is to identify these regions so that the correct portion of the excess number of rectangles that form the regions that can be blended, are output to another device for blending in order to ensure correctness. Thus, once the software algorithm 135 detects a maximal set size P, P−M+1 excess overlapping rectangles are selected and blended, for example on some other device (such as a GPU 150, a CPU core, etc.) Here, M indicates a maximum number of layers that the DCU 140 is able to blend. The result is then bound to one of the DCU's layers, leaving a result with exactly M layers to blend, in order to guarantee blending correctness.

Figure 2:
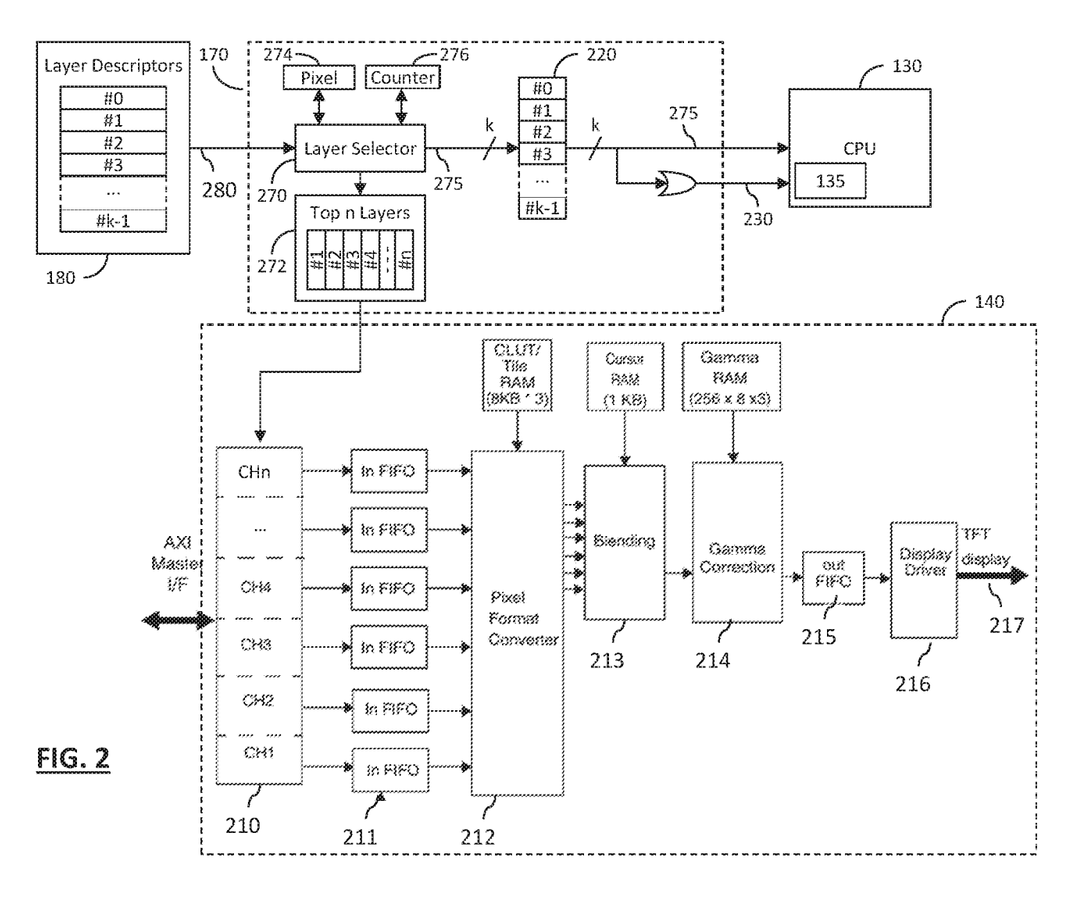
FIG. 2 illustrates an example of a graphics display component with a pixel blending circuit, adapted in accordance with example embodiments of the invention.

FIG. 2 illustrates an example of the graphics display component 125 in greater detail. The DCU 140 includes a memory interface component 210 arranged to receive image data 116 from memory 110 (see FIG. 1). The memory interface component 210 includes a plurality of data channels (CH1-CHn), each data channel being arranged to receive pixel image data 116 relating to one graphics layer. Received pixel image data 116 is stored within input (First-In-First-Out) buffers 211; each data channel of the memory interface component 210 storing received pixel image data 116 within its own input buffer 211. A pixel format converter 212 receives the pixel image data for the individual graphics layers from the input buffers 211, which may be encoded in different formats, and converts the pixel image data into a common format, for example a 32-bit RGBA format, to enable subsequent blending of the layers to be more easily performed. One example of a suitable format is pre-multiplied RGBA (meaning the Alpha channel is already applied to the R, G and B channels). In some examples, this format may be required when one of the layers that is being blended, is itself the result of multiple layers' blending, as is the case when at least M+1 layers are being blended and P−M+1 layers are offloaded to blend on a different device, where P is the size of some maximal set and as described with reference to FIG. 3.

A blend manager 213 receives the converted pixel data for the individual graphics layers and blends the pixel data to generate composite pixel data to be displayed. A gamma correction component 214 performs gamma correction on the composite pixel data, and outputs the corrected composite pixel data to an output buffer 215. A display driver 216 reads the (gamma corrected) composite pixel data from the output buffer 215, and transmits display data 217 to the display device 160, the display data comprising the composite pixel data read from the output buffer 215.

The memory interface component 210 consists of n (e.g. 6) data channels. In this manner, the DCU 140 is able to generate pixel data for each individual pixel within a composite image to be displayed from a blend of up to n graphics layers. However, the number of graphics layers that make up the composite image as a whole may be significantly more than the capacity (n) of the DCU 140. As illustrated in FIGS. 1 and 2, the descriptor register set 180 may be able to store descriptors for up to k (e.g. 32) layers for the composite image as a whole. For each pixel, the layer selection module 170 is arranged to select up to n layers from which pixel data is to be blended in order to generate composite pixel data for the respective pixel, and to configure the memory interface component 210 of the DCU 140 to fetch the relevant pixel data for the selected (up to) n layers.

Due to the adaptable nature of such a graphics display scheme, there is a possibility of the number of active graphics layers (m) overlapping within a single pixel exceeding the number of layers (n) that the DCU 140 is capable of handling. To this end, in the illustrated example, the software algorithm 135 performed by the one or more processor(s) 130, is arranged to instruct the layer selection module 170 to identify a set M of active layers for each pixel, configure the DCU 140 to generate composite pixel data for the respective pixel based on a subset N of layers from the set M, determine whether the number m of active layers in the set M exceeds the maximum capacity n of the DCU 140, and the blend manager 213 is configured to output any excess active layers in the set M that exceed the maximum capacity n to at least, say, one or more other processing units.

For example, and as illustrated in FIG. 2, the descriptor register set 180 may have stored therein descriptors for a set K of k graphics layers from which the composite image as a whole is to be generated. The layer selection module 170 may comprise a layer selector 270 arranged to receive a layer descriptor 280 for each graphics layer in the set K. The layer selector 270 is then arranged to identify the set M of active layers for the rectangle coordinates $(x_1, y_1, x_2, y_2)$ of each layer that has to be blended from the set K based on the layer descriptors therefor, and in accordance with the operational instructions provided by the software algorithm 135. For example, each layer descriptor 280 may comprise indications of the position within the image to be displayed of the respective graphics layer, and dimensions therefor. From such information, the layer selector 270 may determine whether the respective graphics layer overlaps a particular rectangle coordinate, and thus whether the respective graphics layer is 'active' for that rectangle coordinate.

Having identified the set M of active layers for a particular rectangle coordinate, the layer selector 270 may then select a subset N of up to n active layers from the set M to be blended by a first processor unit to generate composite rectangle coordinate data for the respective rectangle. The subset N may be selected based on any suitable criteria. For example, the subset N of active layers may be selected based on a predefined order of the layer descriptors 280 within the descriptor register set 180. In this manner, the priority with which layers are selected for the subset N may be determined based on their respective location within the descriptor register set 180. Accordingly, the layer selector 270 may be arranged to sequentially read layer descriptor information 280 from the layer descriptor register set 180 in priority order, and select the first n graphics layers identified as being active for the respective rectangle coordinate. In the example illustrated in FIG. 2, parameters for each selected active layer may then be stored, for example within selection registers 272. The stored parameters may comprise, for example, address information from where the respective rectangle coordinate data for the selected layer may be retrieved from memory 110, etc. The DCU 140 may then identify a second set U of active layers for a particular rectangle, the layer selector 270 may then select a subset V of up to v active layers from the set M to be blended by a second processor unit to generate composite rectangle coordinate data for the respective rectangle. Thus, once the software algorithm 135 identifies the set M of active layers, the software algorithm 135 or some other software code (not shown) may be configured to split M into n−1 layers that are bound directly to the DCU 140 and m−n+1 layers that are blended on another device (GPU, CPU etc.), with the result being bound to the n-th DCU layer. The DCU 140 itself then takes the n layers bound to it, composes them and displays the result on a screen.

When the subset N of active layers have been selected for a pixel, with parameters for the selected subset N of active layers having been stored within the selection registers 272 in the example illustrated in FIG. 2, the layer selection module 170 is arranged to configure the DCU 140 to generate composite pixel data for said pixel based on the selected subset N of active layers, for example by configuring the memory interface component 210 of the DCU 140 with address information for the selected subset N of active layers, etc., stored in the selection registers 272. In this manner, each channel of the memory interface component 210 may be configured to fetch pixel data from an area of memory defined within the layer descriptor for a respective graphics layer within the selected subset N of active layers.

Alternatively, the software algorithm 135 performed by the one or more processor(s) 130 may be arranged to cause some of the layers from which the composite image is to be generated to be pre-blended by some other CPU(s), a GPU or other processing units, in advance of the DCU 140. The pre-blending with pixel data for a resulting pre-blended layer may be stored in memory 110 and a descriptor for the pre-blended layer may be loaded into the descriptor register set 180. In this manner, multiple original layers from a set V may be pre-blended in advance, in order to generate one or more pre-blended layers to be included within a set V'. Such pre-blending of graphics layers may be performed by computer code executing on the CPU 130, or alternatively such pre-blending may be offloaded to a GPU, where available, such as the GPU 150 illustrated in FIG. 1.

The importance of a graphics object may depend on any appropriate factors, such as, for example, an importance value (e.g. corresponding to the priority value of the corresponding layer) defined for the graphics object, as well as various situational parameters. For example, at night a warning that a vehicles lights are not working properly is more important than during the day. Accordingly, a graphics object used to warn that a vehicle's lights are not working may have a higher importance at night than during the day. Accordingly, the computer program code 135 may additionally determine the importance of a graphics object based on a simple or a complex decision making algorithm, taking into account any number of factors as appropriate.

In the illustrated embodiment, and as described above, the graphics management component to which the blending of layers is output is in the form of computer program code executing on the CPU 130. However, it is contemplated that in some alternative embodiments, such a graphics management component, such as GPU 150, may be arranged to receive the blending of layers and to take steps to determine whether such an excess number of layers can be accommodated, may alternatively be implemented within a standalone component, for example a dedicated hardware component or another processing unit.

Figure 3:
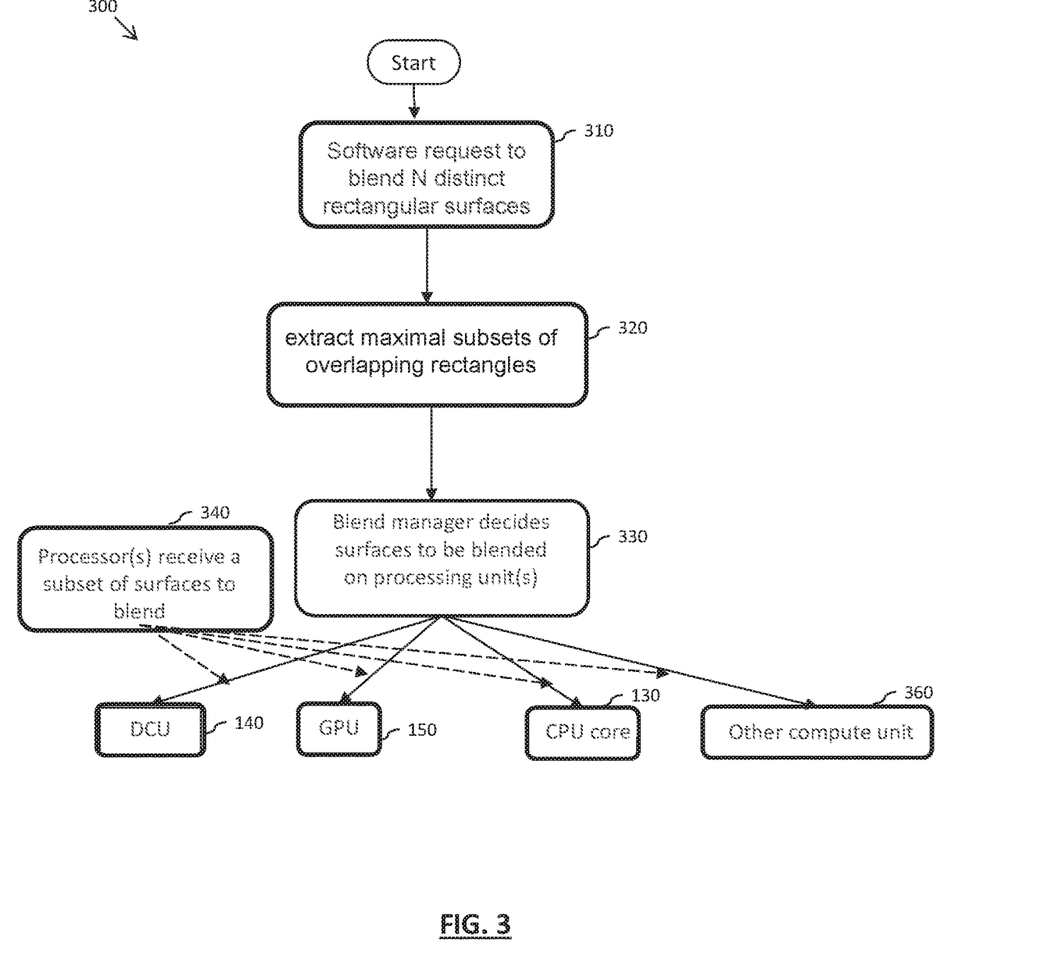
FIG. 3 illustrates an example of a high-level flowchart of a pixel blending operation, in accordance with example embodiments of the invention

Referring now to FIG. 3, an example of a high-level flowchart 300 of a pixel blending operation is illustrated, in accordance with example embodiments of the invention, such as may be implemented within the processing system 100 illustrated in FIG. 1. The flowchart 300 starts and at 310, the processing system receives a software request to blend N distinct rectangular surfaces. At 320, a software algorithm for extracting the maximal subsets of overlapping rectangles is run, such as software algorithm 135 performed by the one or more processor(s) 130 in FIG. 1 or FIG. 2. The software algorithm 135 then calculates a number of maximal sets of surfaces (given as overlapping rectangles) that require blending, but whose cardinality is higher than the maximum allowed. Each of the computed maximal sets of surfaces is passed directly to a blend manager, such as layer selector 270 of FIG. 2. At 330, the Blend manager may then instruct directly 340 one or more of the various processing unit devices DCU 140, GPU 150, CPU 130, or other processing or computation unit 360, on which layers to blend.

Figure 4:
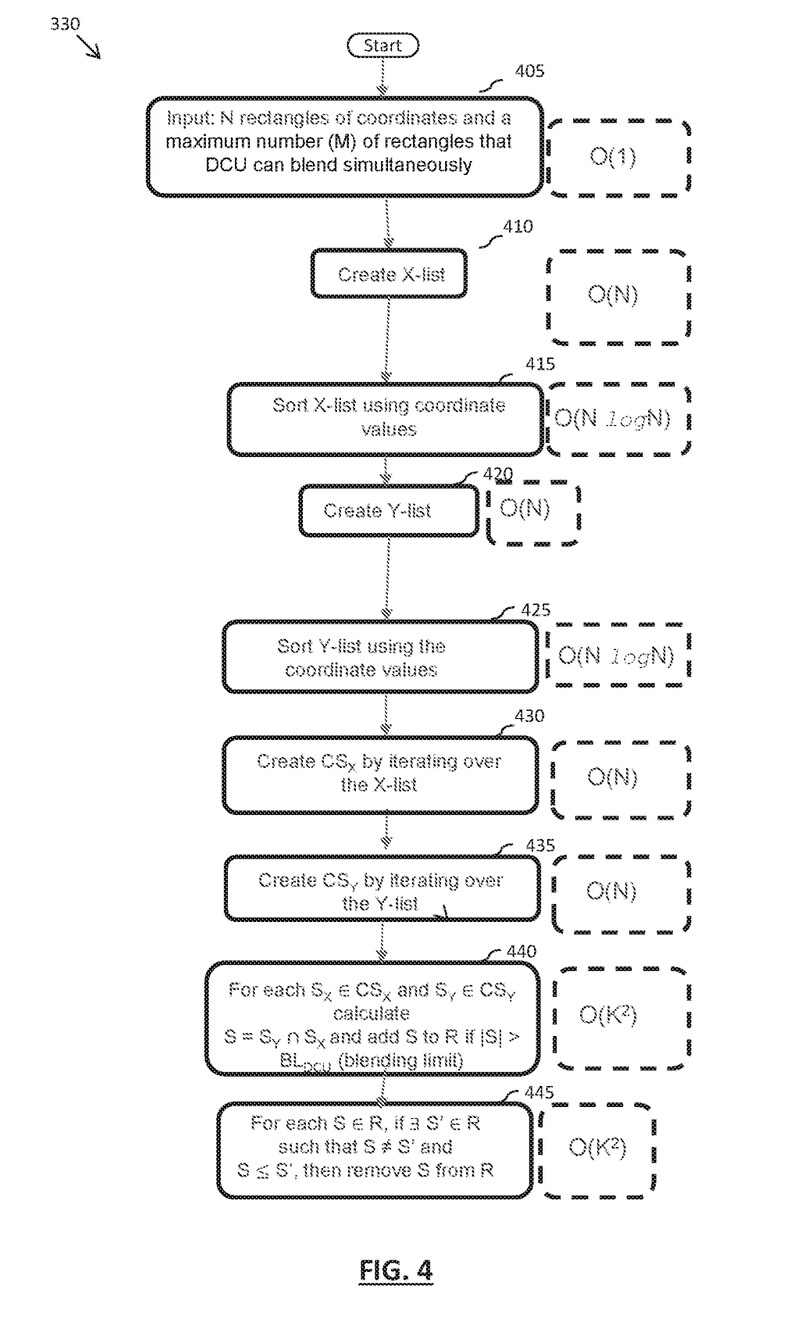
FIG. 4 illustrates a flowchart of a more detailed example of a pixel blending operation, in accordance with example embodiments of the invention

Referring now to FIG. 4, a flowchart of a more detailed example of a pixel blending operation that determines which surfaces are blended is illustrated, in accordance with example embodiments of the invention. The flowchart starts, and at 405, a list of N rectangles of coordinates ($x_1$, $y_1$, $x_2$, $y_2$) is given as input; and M is set to identify a maximum number of rectangles that the DCU can blend simultaneously. At 410, all X coordinates from all rectangles are grouped into a list called the X-list, marking them as S-coord's (all rectangle starting coord's, i.e. all $x_1$'s) and F-coord's (all rectangle finishing coord's, i.e. all $x_2$'s). At 415, the X-list may be sorted, for example in ascending order, and, say, based on the coordinates' values. At 420, the operations of 410 and 415 are repeated for the Y coordinates and a list called the Y-list. At 425, the Y-list may be sorted, for example in ascending order, and, say, based on the coordinates' values.

At 430, the flowchart progresses to determine which surfaces are blended and starts with an empty set $S_x$ and iterates over the X-list that was generated and sorted at 410, 415. Here, if a value $x_i$ is identified as an S-coord, the rectangle that xi belongs to is added to Sx. Otherwise, if it is an F-coord, a check is performed to see if the cardinality of $S_x$ exceeds the DCU's blending limit, given by M in 405. If it is an F-coord and the cardinality of $S_x$ exceeds the DCU's blending limit, given by M in 405, the current $S_x$ is stored into a set of candidate sets, $CS_x$. Then, in this example, the rectangle $x_i$ belongs to is removed from $S_x$.

At 435, the process repeats for the Y-list, in that the flowchart determines which surfaces are blended and starts with an empty set $S_y$, and iterates over the Y-list that was generated and sorted at 420, 425, and the set of candidate sets $CS_y$ built. At 440, and for each rectangle set $S_x$ in $CS_x$ and each rectangle set $S_y$ in $CS_y$, an intersect $S_x$ with $S_y$ is determined in order to obtain a candidate solution set, S. If the cardinality of S exceeds the DCU's blending limit, then S is a solution, so it is stored into the resulting set of solutions, R. At 445, this process is iterated over elements of R, by removing all elements that are subsets of some other elements in R. This results in a number of elements R that contains all unique maximal sets of rectangles that cannot be simultaneously blended on the DCU.

In some examples, some benefits of the invention may be achieved through the use and ease of parallelization, as illustrated in the parallel inputs of FIG. 2. For example, the operations of 410, 415, of building, sorting and iterating through the X-list can be done completely in parallel to the same operations of 420, 425, of building, sorting and iterating through the Y-list. Furthermore, in some examples, the operations of 430, 435, 440 may be performed in a parallel manner by dividing $CS_x$ into multiple equally-sized chunks and having each processor unit receive one chunk and intersect its elements with those in $CS_y$. Similarly, operation 445 may be parallelized by dividing R into multiple equally-sized chunks and having each processor unit receive one chunk and scan all elements inside it against the other elements in R. Here, in this example, elements to be removed may be marked as such and then at the end, one sweep over the entire contents of R will remove these marked elements.

A first example of a serial code that may be used to implement 440 on a processing unit with a single core is illustrated below:

foreach $S_x$ in $CS_x$
foreach $S_y$ in $Cs_y$
let S=Sx∩Sy
if |S|>2D_ACE_Blend_Limit
then store S As would be appreciated by a skilled person, the computational complexity here may be defined as: $\Theta$ (|$CS_2$|×|$CS_y$|) per core A second example of a parallel code that may be used to implement 440 on a processing unit with multiple cores, where CSx is divided into P chunks for P processors, is illustrated below:

foreach $S_x$ in $CS_x$[coreID]
foreach $S_y$ in $CS_y$
let S=Sx∩Sy
if |S|>2D_ACE_Blend_Limit
then store S As would be appreciated by a skilled person, the computational complexity here may be defined as: $\Theta$ (|CSx|×|CSy|/P) per core.

Figure 5:
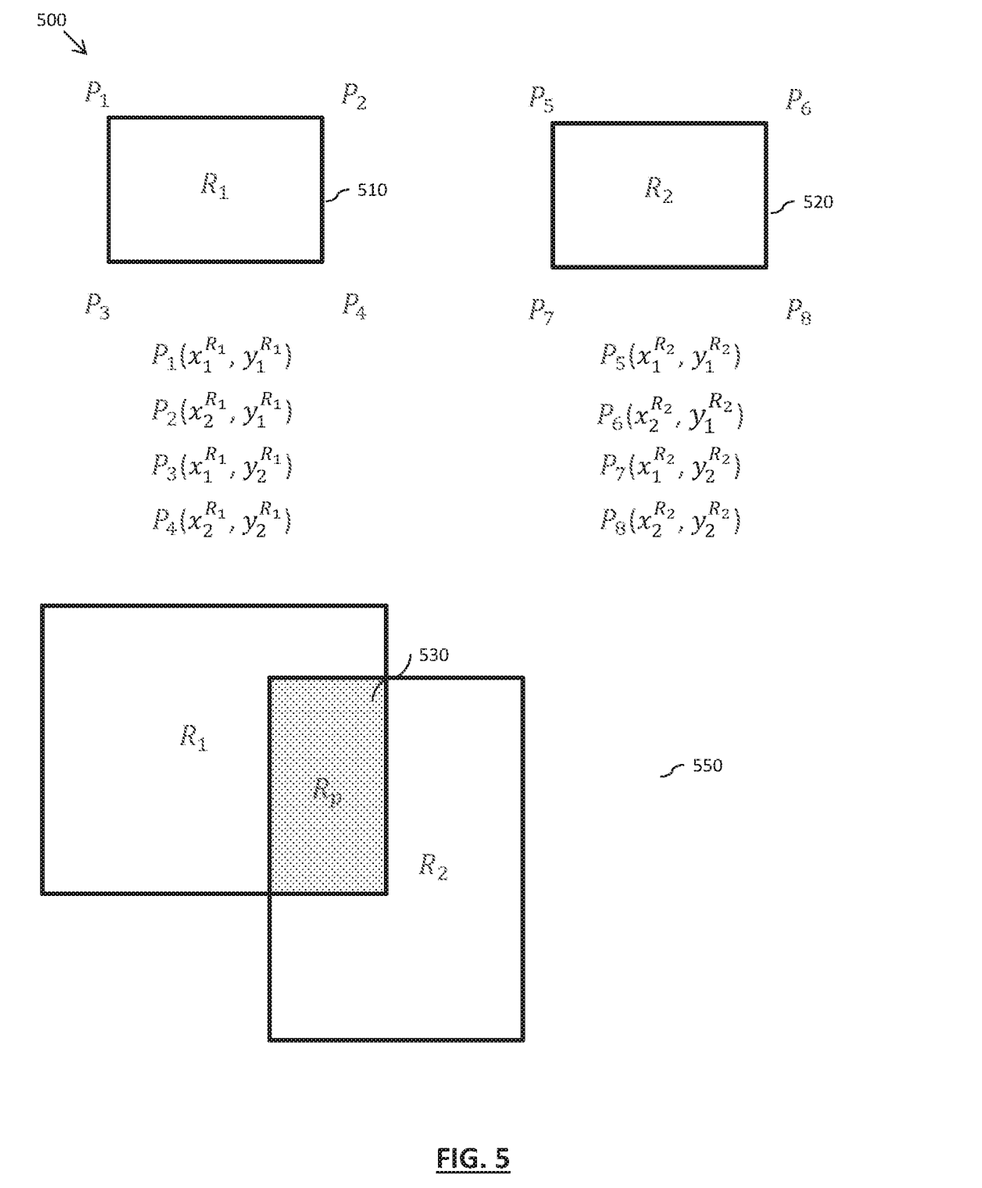
FIG. 5 illustrates pictorially a variety of 2-rectangle overlap arrangements for a pixel blending operation in accordance with example embodiments of the invention.

Referring now to FIG. 5, a pictorial example 500 of a 2-rectangle overlap arrangement for a pixel blending operation is illustrated, in accordance with example embodiments of the invention. Given two rectangles, $R_1$ ($x_1^{R_1}$, $y_1^{R_1}$, $x_2^{R_1}$, $y_2^{R_1}$) 510 and $R_2$ ($x_1^{R_2}$, $y_1^{R_2}$, $x_2^{R_2}$, $y_2^{R_2}$) 520, then $R_1 \cap R_2 \neq \emptyset \Leftrightarrow \exists P$ ($x_p$, $y_p$) s.t. max($x_1^{R_1}$, $x_1^{R_2}$)≤$x_p$≤min($x_2^{R_1}$, $x_2^{r_2}$) and max($y_1^{R_1}$, $y_1^{R_2}$)≤$y_p$≤min ($y_2^{R_1}$, $y_2^{R_1}$). A skilled artisan will appreciate that this expression encompasses rectangles $R_1$ and $R_2$ that intersect if, and only if, there exists a point $P(x_p, y_p)$ such that $x_p$ is greater than both $x_1$'s of $R_1$ and $R_2$ and smaller than both $x_2$'s of $R_1$ and $R_2$ and, simultaneously, $y_p$ is greater than both $y_1$'s of $R_1$ and $R_2$ and smaller than both $y_2$'s of $R_1$ and $R_2$. A skilled artisan recognizes that this statement is easy to prove and can be extended to any number of rectangles, $R_1 \ldots R_N$.

Referring back to FIG. 3, with regard to 320, and the flowchart of FIG. 4, for example, let us assume an image with the two illustrated rectangles of pixels, $R_1$ 510 and R2 520. The inventors have recognized and appreciated that identifying a region 530, in which $R_1$ 510 and R2 520 overlap (i.e. $R_1 \cap R_2 \neq \emptyset$) in 550, is equivalent to identifying that there exists a rectangle Rp that is contained in both of $R_1$ 510 and $R_2$ 520. That is let the intersection $R_1$ of and $R_2$ be defined as: $R_p=R_1 \cap R_2$.

Thereafter, the inventors have proposed identifying a point $P(x_p, y_p)$, which is located inside $R_p$ 530. Given then that $R_p$ 530 is in both $R_1$ 510 and $R_2$ 520, this means that $x_1^{R_1} \leq x_p \leq x_2^{R_1}$ and, notably and simultaneously $x_1^{R_2} \leq x_p \leq x_2^{R_2}$. The same rationale applies equally in the 'Y' direction. That is:

$$P \in R_p \Leftrightarrow P \in R_1 \text{ and } P \in R_2, \text{ But:}$$

$$P \in R_1 \Leftrightarrow x_1^{R_1} \leq x_p \leq x_2^{R_1} \text{ and } y_1^{R_1} \leq y_p \leq y_2^{R_1}$$

$$P \in R_2 \Leftrightarrow x_1^{R_2} \leq x_p \leq x_2^{R_2} \text{ and } y_1^{R_2} \leq y_p \leq y_2^{R_2}$$

Now $$x_1^{R_1} \leq x_p \text{ and } x_1^{R_2} \leq x_p \Leftrightarrow \max(x_1^{R_1}, x_1^{R_2}) \leq x_p$$

By analogy: $x_p \leq \min(x_1^{R_1}, x_1^{R_2})$

Similarly it is possible to obtain the inequalities for $y_p$

Therefore, it is correct to state that $x_1^{R_1} \leq x_p$ and $x_1^{R_2} \leq x_p$ is equivalent to $\max(x_1^{R_1}, x_1^{R_2}) \leq x_p$. Similarly it is correct to state: $x_p \leq \min(x_2^{R_1}, \ldots, x_2^{R_K})$. The availability of a list with all 'X' coordinates (both $x_1$'s and $x_2$'s) sorted in, for example, ascending order allows for a very fast calculation of all values of the type $\max(x_1^{R_1}, \ldots, x_1^{R_K})$ and $\min(x_2^{R_1}, \ldots, x_2^{R_K})$, where $R_1 \ldots R_K$ is a subset of rectangles. To understand why this is needed, consider some intermittent set Sx=$\{x_1^{R_{i1}} x_1^{R_{i2}} \ldots, x_1^{R_{ik}}\}$ (containing S-coords from some K rectangles). If the next value we query is an F-coord, $x_2^{R_{ip}}$ (with p being one of the rectangles $i_1 \ldots i_k$), then if all X values were previously sorted in, for example, in ascending order, it follows that $x_1^{R_{i1}} \leq x_1^{R_{i2}} \ldots \leq x_1^{R_{ik}} \leq x_2^{R_{ip}}$. Therefore, the interval $[x_1^{R_{ik}} \ldots x_2^{R_{ip}}]$ is present in all rectangles $i_1 \ldots i_k$ on the X axis. Again, the same rationale applies equally in the 'Y' direction.

It follows that if $S_x \cap S_y = \{R_1, \ldots, R_p\}$ for some $S_x$ and $S_y$, then $R_1 \ldots R_p$ intersect on both X and Y dimensions or, equivalently, overlap. Thus, through its construction, $S_x$ represents a set of rectangles that intersect on the X dimension. Whilst all elements from R are built on sets of rectangles that overlap in 440, the software algorithm, such as software algorithm 135 performed by the one or more processor(s) 130 in FIG. 1 or FIG. 2, is only interested in obtaining the maximal (largest) unique sets, in order to avoid subsequent duplicate processing of solutions, which results in step 445.

Advantageously, this theoretical run-time complexity is reduced to: O(N log N)+O($K^2$), where N is the number of input rectangles and for effectively all practical use-cases, K is small. Advantageously, this is computationally much less complex that solving the problem through the use of known blenders. Such a known blender solves a problem $P_1$ of: 'given N rectangles, find all pairs of rectangles that overlap'. A solution $S_1$ for this is generally of the form: $S_1=\{\{R_i, R_j\}|1 \leq i \leq j \leq N\}$ (a set of rectangle pairs). On the other hand, the problem addressed here can be defined as $P_2$: 'given N rectangles, find all maximal sets of rectangles with a cardinality of at least 'C' where every pair of rectangles in the set overlaps'.

In an attempt to solve $P_2$ using $P_1$, a graph G=(V, E) may be built, where vertex $V_k$ corresponds to rectangle $R_k$ and an edge e=($V_i$, $V_j$) exists only if $\{R_i, R_j\} \in S_1$ (i.e. an edge is a pair of intersecting rectangles). This solution $S_2$ to problem $P_2$ is generally in the form: $S_2=\{R_{i1}, \ldots, R_{ik}\}$ |1≤ $i_1 \leq \ldots \leq i_k \leq N$ and C≤k and $\forall p, q \in \{v\ p, q \in \{i_1, \ldots, i_k\}$ with p≤q, $\{R_p, R_q\} \in S_1\}$. Mapping this to G means finding all maximal sets of vertices $\{V_{i1}, \ldots, V_{ik}\}$ such that all pairs formed with elements of this set have vertices connected by an edge and the size of each set is greater or equal to 'C'. This is equivalent to finding all maximal cliques of at least 'C' vertices in an arbitrary graph, which is achieved by finding all maximal cliques and then discarding those with less than C vertices. The problem of finding all maximal cliques is O($3^{N/3}$) (as identified in the Bron-Kerbosch algorithm). The algorithm 135 proposed in examples of this invention aims to solve $P_2$ directly, with a much lower computational cost.

Figure 6:
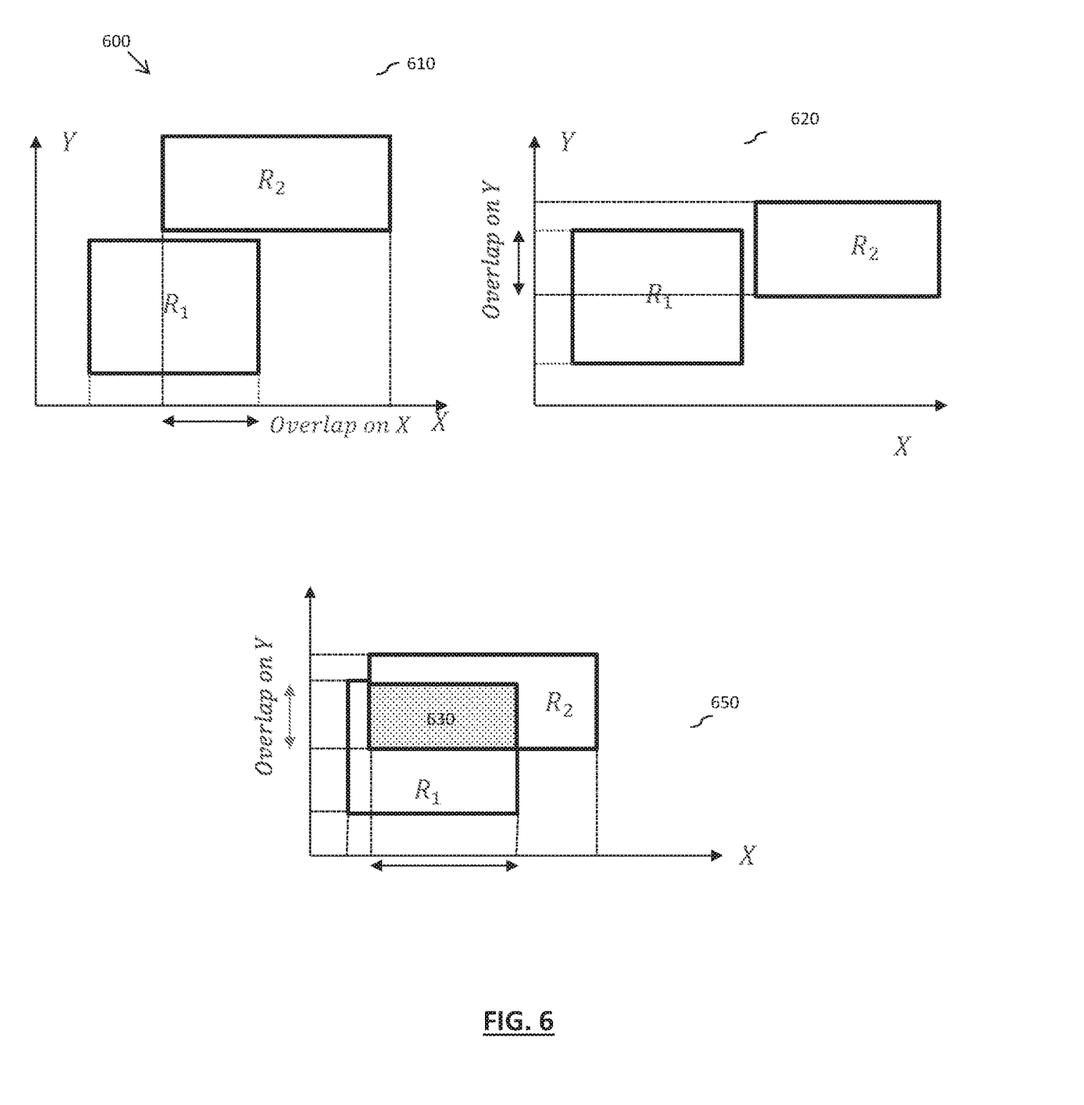
FIG. 6 illustrates pictorially a further variety of 2-rectangle overlap arrangements for a pixel blending operation in accordance with example embodiments of the invention.

Referring now to FIG. 6, a further pictorial example of a 2-rectangle overlap scenario for a pixel blending operation is illustrated in accordance with example embodiments of the invention. Here, in 610: $S_x=\{R1, R2\}$ as there is an overlap on the 'X' axis. However, $S_y=\emptyset$, as there is no overlap on the 'Y' axis. It follows that $S_x \cap S_y = \emptyset$, as $R_1$ and $R_2$ don't overlap. Similarly, in the pictorial example 620, $S_y=\{R1, R2\}$ as there is an overlap on the 'Y' axis. However, as there is no overlap on the 'X' axis, $S_x=\emptyset$. Hence, it follows that $S_x \cap S_y=\emptyset$, as $R_1$ and $R_2$ don't overlap.

However, in pictorial example 650 $S_y=\{R1, R2\}$ as there is an overlap on the 'Y' axis. Also, $S_x=\{R1, R2\}$, as there is an overlap on the 'X' axis. Thus, it follows that $S_x \cap S_y=\{R_1, R_2\}$, as there is an overlap between R1 and R2. Hence, it follows that if $S_x \cap S_y=\{R_1, \ldots, R_p\}$ for some $S_x$ and $S_y$, then $R_1 \ldots R_p$ intersect on both 'X' and 'Y' dimensions or, equivalently, overlap, as illustrated in 650

The invention may be implemented at least in part in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a tangible and non-transitory computer readable storage medium or transmitted to the computer system via a computer readable transmission medium. All or some of the computer program may be provided on computer readable media permanently, removably or remotely coupled to an information processing system. The tangible and non-transitory computer readable media may include, for example and without limitation, any number of the following: magnetic storage media including disk and tape storage media; optical storage media such as compact disk media (e.g., CD-ROM, CD-R, etc.) and digital video disk storage media; non-volatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, examples of the invention have been described with reference to specific examples of embodiments of the invention. It will, however, be evident that various modifications and changes may be made therein without departing from the scope of the invention as set forth in the appended claims and that the claims are not limited to the specific examples described above.

Furthermore, because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected,' or 'operably coupled,' to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an,' as used herein, are defined as one or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an.' The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A data processing system comprising:
a graphics display component for creating an image to be displayed, the graphics display component comprising:
a layer selection module configured to identify a set, M, of active layers for at least one pixel to be displayed;
a display controller unit, DCU, operably coupled to the layer selection module and comprising a blend manager; and
at least one processor and one or more processing units;
wherein the data processing system is characterised by the at least one processor configured to determine whether a number, m, of active layers in the set, M, exceeds a blend limit, n, of a maximum number of graphical surfaces that can be blended simultaneously by the DCU and, in response thereto, identify a subset N of up to n layers from the set M of active layers;
the blend manager configured to bind the subset N of active layers directly to the DCU and output any excess active layers in the set, M, that exceeds the n layers to at least one selected processing unit for blending; and
the DCU configured to generate composite pixel data to be displayed based on separate blends from the DCU and the at least one selected processing unit that blended the excess active layers in the set, M,
wherein the processor is configured to determine whether the number, m, of active layers in the set, M, exceeds the blend limit, n, by determining for each rectangle set $S_x$ in a first candidate set, $CS_x$ and each rectangle set $S_y$ in a second candidate set, $CS_y$, whether an intersect $S_x$ exists with $S_y$ to obtain a candidate solution set, S.

2. The data processing system of claim 1 wherein the graphical surfaces comprise pixel rectangles and the processor identifies a maximal set, P, of active layers of N rectangle regions that can be blended by the DCU.

3. The data processing system of claim 2, wherein the processor identifies sets of M+1, of active layers of N rectangle regions that are guaranteed to simultaneously overlap.

4. The data processing system of claim 1, wherein the layer selection module is arranged to select the subset N of layers from the set M of active layers based on at least one of:
a predefined order of layer descriptors; and
priority values defined within the layer descriptors.

5. The data processing system of claim 4, wherein the at least one processor is further configured to, for each active layer in the set M for each pixel to be displayed:
group all 'X' coordinates from a plurality of rectangles into a first list, X-list,
mark the 'X' coordinates as either rectangle starting coordinates, or rectangle finishing coordinates;
sort, the X-list based on the coordinates' values;
group all 'Y' coordinates from a plurality of rectangles into a second list, Y-list,
mark the 'Y' coordinates as either rectangle starting coordinates, or rectangle finishing co-ordinates; and
sort, the Y-list based on the coordinates' values.

6. The data processing system of claim 5, wherein the processor is configured to determine which surfaces are to be blended and:
processes a first empty set $S_x$ and iterates over the sorted X-list; and
processes a second empty set $S_y$ and iterates over the sorted Y-list.

7. The data processing system of claim 1 wherein the candidate solution set, S, is stored into a resulting set of solutions, R, and the processor iterates the candidate solution set, S over a plurality of elements, R, by removing all elements that are subsets of some other elements in R.

8. The data processing system of claim 7 wherein, in response to removing all elements that are subsets of some other elements in R, the processor identifies a number of elements R that contain all unique maximal sets of rectangles that cannot be simultaneously blended on the DCU.

9. The data processing system of claim 1 wherein $CS_x$ is divided in a parallel manner into multiple equally-sized chunks and wherein at least one processing unit of the one or more processing units is configured to receive one chunk and intersect its elements with those in $CS_y$.

10. A method of managing graphics layers within a data processing system comprising a display controller unit, DCU, and at least one processor and one or more processing units, the method comprising:
identifying a set M of active layers for at least one pixel to be displayed;
determining whether a number, m, of active layers in the set, M, exceeds a blend limit, n, of a maximum number of graphical surfaces that can be blended simultaneously by a DCU and, in response thereto,
identifying a subset N of up to n layers from the set M of active layers;
binding the subset N of active layers directly to the DCU and outputting any excess active layers in the set, M, that exceeds the n layers to at least one selected processing unit for blending;
generating composite pixel data to be displayed based on separate blends from the DCU and the at least one selected processing unit that blended the excess active layers in the set, M,
wherein the processor is configured to determine whether the number, m, of active layers in the set, M, exceeds the blend limit, n, by determining for each rectangle set $S_x$ in a first candidate set, $CS_x$ and each rectangle set $S_y$ in a second candidate set, $CS_y$, whether an intersect $S_x$ exists with $S_y$ to obtain a candidate solution set, S.

11. The method of claim 10 wherein the graphical surfaces comprise pixel rectangles and the processor identifies a maximal set, P, of active layers of N rectangle regions that can be blended by the DCU.

12. The method of claim 11, wherein the processor identifies sets of M+1 of active layers of N rectangle regions that are guaranteed to simultaneously overlap.

13. The method of claim 10, wherein the layer selection module is arranged to select the subset N of layers from the set M of active layers based on at least one of:
a predefined order of layer descriptors; and
priority values defined within the layer descriptors.

14. The method of claim 13, wherein the at least one processor-is further configured to, for each active layer in the set M for each pixel to be displayed:
group all 'X' coordinates from a plurality of rectangles into a first list, X-list,
mark the 'X' coordinates as either rectangle starting coordinates, or rectangle finishing coordinates;
sort, the X-list based on the coordinates' values;
group-all 'Y' coordinates from a plurality of rectangles into a second list, Y-list,
mark the 'Y' coordinates as either rectangle starting coordinates, or rectangle finishing coordinates; and
sort, the Y-list based on the coordinates' values.

15. The method of claim 14, wherein the processor is configured to determine which surfaces are to be blended and:
processes a first empty set $S_x$ and iterates over the sorted X-list; and
processes a second empty set $S_y$ and iterates over the sorted Y-list.

16. The method of claim 14 wherein the candidate solution set, S, is stored into a resulting set of solutions, R, and the processor iterates the candidate solution set, S over a plurality of elements, R, by removing all elements that are subsets of some other elements in R.

17. The method of claim 16 wherein, in response to removing all elements that are subsets of some other elements in R, the processor-identifies a number of elements R that contain all unique maximal sets of rectangles that cannot be simultaneously blended on the DCU.

18. The method of claim 14 wherein $CS_x$ is divided in a parallel manner into multiple equally-sized chunks and wherein at least one processing unit of the one or more processing units is configured to receive one chunk and intersect its elements with those in $CS_y$.

* * * * *